Patented Aug. 15, 1939

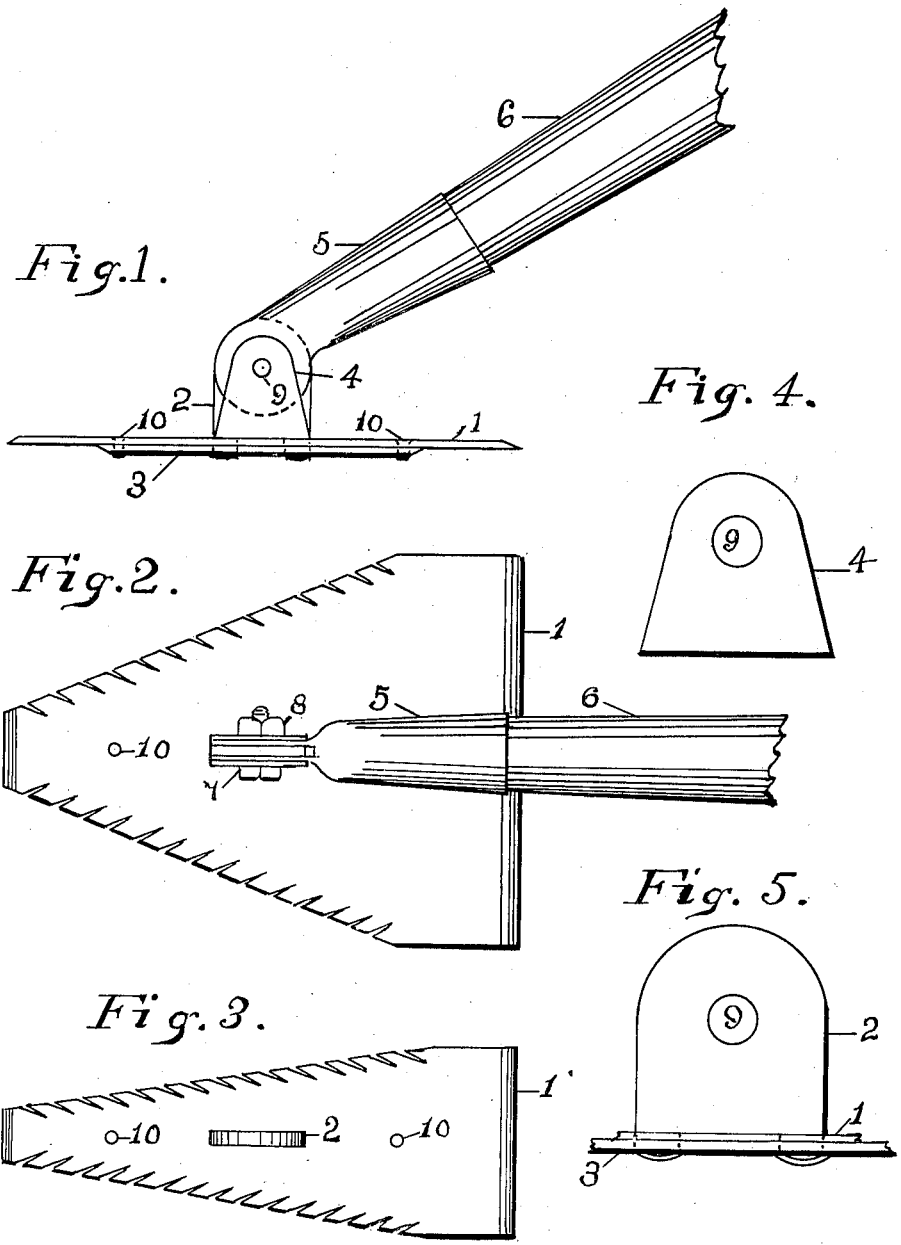

2,169,557

UNITED STATES PATENT OFFICE 2,169,557

HAND HOE

Charles E. Curtiss, Clinton, Wis.; Rock County Savings and Trust Company executor of estate of said Curtiss, deceased Application August 10, 1936, Serial No. 95,202

1 Claim. (Cl. 306—16)

My invention relates to improvements in hand hoes whereby a plurality of blades may be used, interchangeably, upon one and the same handle and whereby the angle between the blade and the handle may be varied to suit conditions of plants and soil.

The objects of my invention are, first, to provide a push or scuffle hoe with a blade with two working ends differing from each other in form, second, to provide for reversing the blade on the handle, which allows the use of either end of the blade to be used as the front end, third, to provide means for securing the blade to the handle in any desired adjusted position by means of friction of the parts without the use of positive stops of any kind.

I attain these objects by the mechanism illustrated in the accompanying drawing in which Fig. 1 is a vertical projection of the complete hoe with the pivotal clamping bolt and nut removed. Fig. 2 is a top view of the hoe with regular blade, the handle being in a plane parallel to that of the blade. Fig. 3 is a top view of a supplemental blade which replaces the regular blade for use in narrow spaces. Fig. 4 is an enlarged view, in elevation, of one of the auxiliary members and Fig. 5 is an enlarged view, in elevation, illustrating the method of fastening the tang to the blade and supporting bar. Similar numerals refer to similar parts throughout the several views.

This invention consists of an oblong metal plate or blade 1 one end of which is substantially square and the opposite end tapered centrally of blade and perpendicular thereto is fixed a comparatively thin broad member 2 which serves as a tang and has an aperture 9 for the reception of a pivotal clamping bolt. In order to use a thinner metal blade and to afford a better foundation for securing the tang to the blade, a supporting bar 3 may be fixed to the under side of the blade, extending lengthwise thereof.

In order to connect the blade to an operating handle 6 a ferrule 5 having a tapered handle receiving portion at one end and parallel apertured tang embracing extensions at the other, is used. The handle 6 is tapered to fit the ferrule 5 and has no shoulder to abut the ferrule, hence, the ferrule may be easily detached from the regular long handle and a short handle substituted, which adapts the hoe to hand weeding, which is usually necessary with small close plants.

To increase friction sufficiently to retain the blade in any desired position, with relation to the handle, specially formed auxiliary members 4 are used on either side of the ferrule extensions, which, as a secondary function, they reinforce. These washers are closely apertured to receive the clamping bolt and have a base which contacts with the upper side of the blade, hence, any tendency of the blade to move, in operation, is resisted by friction of the auxiliary members bearing on the outside of the ferrule extensions, the friction between the ferrule extensions and the tang plus that of the auxiliary members is all that is required to retain the blade in any position of adjustment desired. The form of the special auxiliary members 4 is clearly shown in Fig. 4.

Fig. 5 shows one method of securing the tang 2 to the blade 1. The lower end of the tang 2 is cut away in its central portion to form a bearing on the blade 1, extensions of the tang 2 shown by dotted lines, Fig. 5, pass through registering holes in the blade 1 and supporting bar 3 and are riveted to the under side of the latter, the blade 1, tang 2 and supporting bar 3 may be united by means of any other well known method.

I do not confine myself to a blade of exact form and dimension, as the use of this hoe varies with the season, soil and plant conditions, hence, blades of different form and width are desirable, to be used during the growing season; for this reason a plurality of blades may be provided, to be used interchangeably upon the same handle; because of the high and increasing cost of quality hoe handles, it is desirable to use more than one form of blade on the same handle; for hand weeding of onions and the like, the regular long handle may be replaced by an inexpensive short handle. Without departing from the spirit of this invention, all edges of the blade may be sharpened in the usual manner or a part of them may be sharpened and others beveled and serrated. I prefer sharpening of the blade as shown in Fig. 2, the ends sharpened in the usual way and the tapered edges serrated.

From the foregoing, taken in connection with the drawing, the construction, adjustments and use of my invention will be readily understood.

What is claimed is:

In an implement of the character described, in combination, a blade having a tang fixed centrally of said blade, a coacting ferrule having a bifurcated extension embracing said tang, auxiliary members having one straight edge in contact with the upper face of said blade, said auxiliary members situated one on either side of said extension in contact therewith, said tang, extension and auxiliary members having registering apertures for the reception of a clamping bolt, a clamping bolt within said apertures and a nut upon said clamping bolt to force the auxiliary members, extension and tang into intimate frictional contact as set forth.

CHARLES E. CURTISS.